Patented Oct. 9, 1951

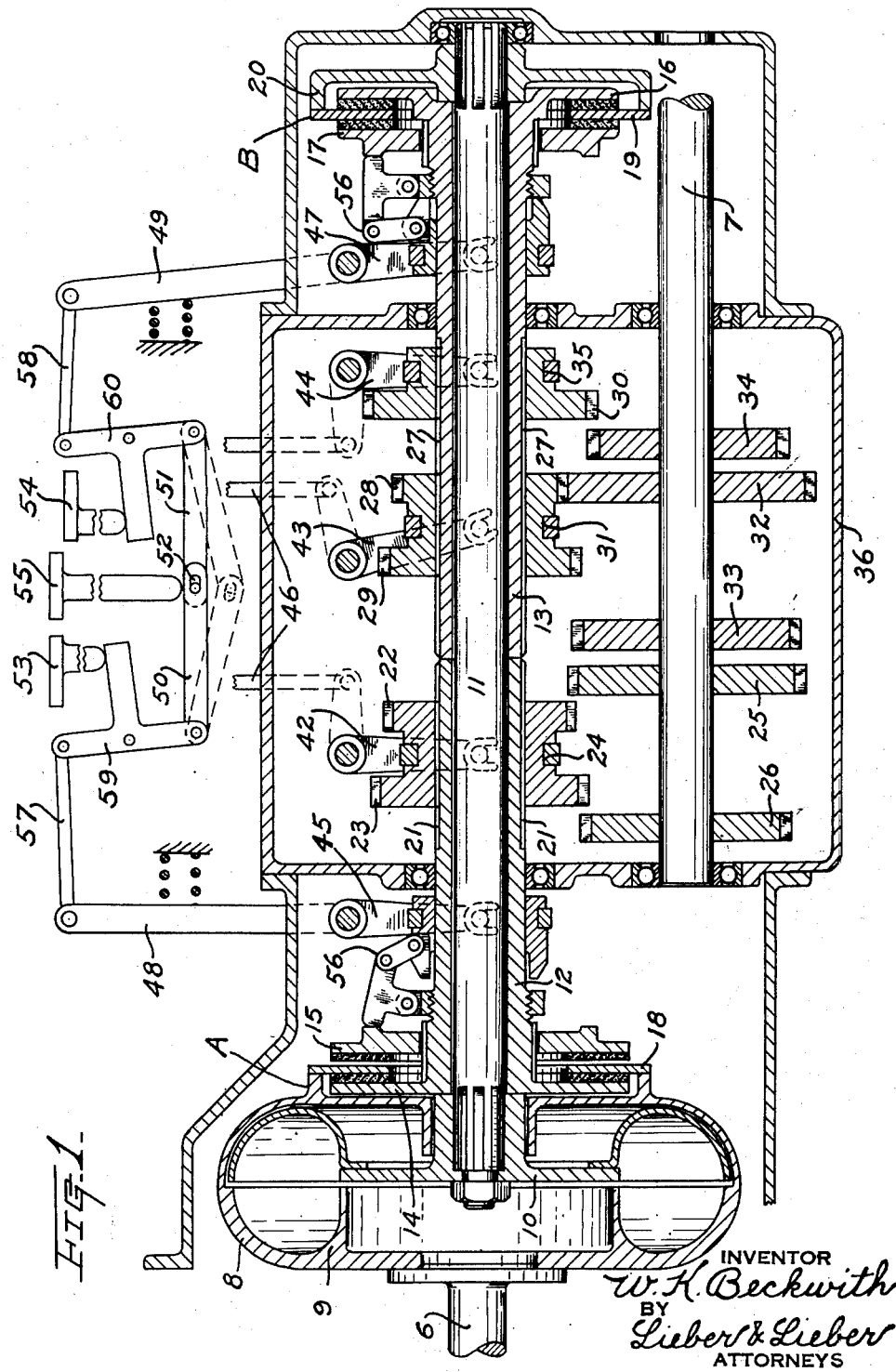

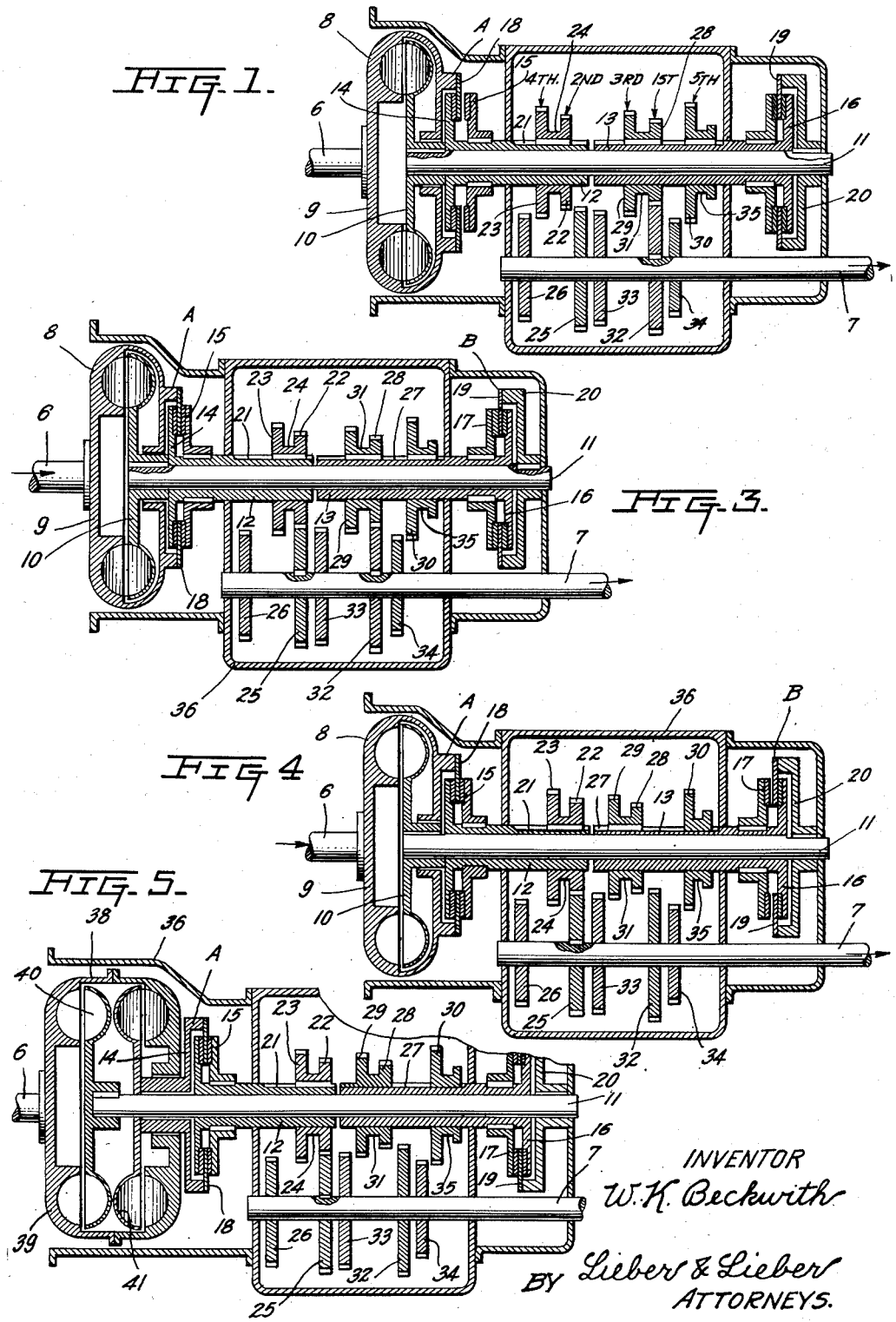

2,570,192

UNITED STATES PATENT OFFICE 2,570,192

POWER TRANSMISSION

Wendell K. Beckwith, Whitewater, Wis., assignor to Koehring Company, Milwaukee, Wis., a corporation of Wisconsin Application June 26, 1944, Serial No. 542,141

8 Claims. (Cl. 74—732)

1

The present invention relates generally to improvements in the art of transmitting power, and relates more specifically to improvements in the construction and operation of mechanism for transmitting power at variable speed from a driving source to a driven element.

The primary object of my invention is to provide an improved variable speed power transmission which is simple in construction, flexible in its adaptations, and efficient in operation.

Most of the prior power transmitting mechanisms for conveying power at variable speed from a rotary driving source or element to a rotary driven element, are not adapted to effect variations in speed without interrupting the drive during the periods of speed changing. Such interruption of the continuity in these mechanisms or drives, makes them extremely objectionable especially when heavily loaded, and frequently results in accidents when it is attempted to change speeds under abnormal load conditions. It is therefore exceedingly desirable in mechanisms of this general type, to be able to change from one speed to another while maintaining constant torque and thus eliminating interruption in continuity of driving or power transmission; and while it has heretofore been proposed to accomplish this desirable result electrically and hydraulically, no commercial means of utilizing ordinary speed changing gears in a constant torque rotary motion power transmission has heretofore been made available to the public.

It is therefore another important object of the present invention to provide an improved constant drive variable speed rotary power transmitting mechanism wherein increases or decreases in speed may be readily and safely effected with the aid of ordinary shiftable gears, and regardless of load conditions.

Another object of this invention is to provide a compact and sturdy mechanical power transmitting device, which is especially adapted for use in driving internal combustion engine driven vehicles, and which will materially enhance the safety in operation of heavy vehicles of this general class.

A further object of my invention is to provide a constant torque variable speed power transmission assemblage which is fool-proof in operation, and wherein several speed changes may be quickly and conveniently effected without danger of damaging parts of the mechanism or of injuring the operator.

Still another object of the invention is to provide an improved variable speed mechanical power transmission adapted to be utilized for diverse purposes, and which may be manufactured and installed at moderate cost.

These and other objects and advantages of the present improvement will be apparent from the following detailed description.

A clear conception of the several features constituting my present invention, and of the construction and operation of two specific types of power transmitting mechanisms embodying the same, may be had by referring to the drawing accompanying and forming a part of this specification wherein like reference characters designate the same or similar parts in the various views.

Fig. 1 is a central longitudinal section through a typical commercial five speed constant torque power transmitting unit, showing diagrammatically the mechanisms for actuating the clutches and for shifting the gears;

Fig. 2 is a small diagram of the five speed constant torque power transmitting mechanism illustrated in Fig. 1, showing the spotted driving elements disposed so as to transmit power at low or 1st speed from the driving to the driven element thereof;

Fig. 3 is a similar diagram of the same mechanism, showing the relative momentary disposition of the spotted driving elements when changing from 1st to 2nd speed, or vice versa;

Fig. 4 is another similar diagram of the same transmission mechanism, showing the spotted driving elements thereof fully shifted into 2nd speed position; and Fig. 5 is a further small diagram of a similar five speed constant torque power transmission assemblage, embodying a double or modified fluid coupling.

While the invention has been shown and described herein as having been embodied in a five speed spur-gear constant drive rotary power transmission having either a single or a double fluid coupling associated therewith, it is not my desire or intention to thereby unnecessarily restrict the scope or utility of the improvement; and the term "fluid coupling" as used herein is intended to include so-called hydraulic couplings and other devices adapted to transmit constant torque from one rotary element to another while permitting differential action between the two different speed ratios at the time the power application is shifted from one ratio to the other.

Referring specifically to Fig. 1, the improved constant torque five speed power transmission shown therein, comprises a driving element or shaft 6 adapted to derive power or rotary motion from any suitable source; a driven element or shaft 7 adapted to impart power or rotary motion to various types of power consumption devices; a constant torque fluid coupling 8 having coaxial relatively rotatable members 9, 10 of which the member 9 is rigidly attached to the power delivery end of the drive shaft 6; a counter shaft 11 having one end rigidly attached to the other member 10 of the coupling 8; a pair of independent coaxial sleeves 12, 13 embracing the counter-shaft 11; a rotary clutch A interposed between the sleeve 12 and the member 9 of the coupling 8; another rotary clutch B interposed between the other end of the countershaft 11 and the sleeve 13; five sets of speed changing elements such as gears interposed between the sleeves 12, 13 and the driven shaft 7; and structure for shifting the gears and for normally supporting and enclosing the mechanism.

The constant torque fluid coupling 8 is of well known construction, the members 9, 10 being normally rotatable at the same speed but being adapted to slip or rotate relative to each other when subjected to excessive torque, without decreasing the power or torque transmission. The counter-shaft 11 is preferably disposed in axial alinement with the driving shaft 6, and the coaxial sleeves 12, 13 are not directly connected to the shaft 11 so that this shaft may rotate freely within either sleeve when the corresponding clutch A or B is disconnected. The friction clutches A, B may be of conventional construction, and the clutch A has a fixed disc 14 rigidly associated with the sleeve 12 and a movable disc 15 splined for movement with the aid of the usual shift lever 45 along this sleeve; while the clutch B likewise has a fixed disc 16 rigidly associated with the other sleeve 13 and a movable disc 17 splined for movement with the aid of another shift lever 47 along the sleeve 13. The clutch A furthermore has a disc 18 rigidly secured to and carried by the member 9 of the fluid coupling 8 and which is interposed between its discs 14, 15; while the clutch B has a similar disc 19 secured to the counter-shaft 11 by means of a carrying member 20, and which is likewise interposed between the clutch discs 16, 17; and the clutches A, B are associatively timed when manipulated during ratio changing period.

The sleeve 12 is also provided with one or more longitudinal external slots 21 and carries the 2nd and 4th speed changing gears 22, 23 respectively, which are splined in the slots 21 and are shiftable in opposite directions by a common intervening shifting lever 42 of well known construction coacting through a shifting collar with the annular groove 24, so as to interchangeably connect either the gear 22 with a gear 25, or the gear 23 with the gear 26, both of these gears 25, 26 being rigidly attached to the driven shaft 7. The other sleeve 13 is likewise provided with one or more elongated external slots 27 and carries the 1st, 3rd and 5th speed changing gears 28, 29, 30 respectively, which are splined for movement along the slots 27. The gears 28, 29 are shiftable in opposite directions by means of a similar well known shift lever 43 coacting through a shifting collar with an intervening annular groove 31, to interchangeably connect either the gear 28 with a gear 32 or the gear 29 with a gear 33, both of which gears 32, 33 are likewise rigidly secured to the driven shaft 7; and the 5th speed gear 30 is also shiftable into and out of mesh with still another gear 34 which is also rigidly attached to the driven shaft 7, by means of a lever 44 coacting through a shifting collar with an annular groove 35. With this assemblage, five different speeds of transmission or speed ratios may obviously be obtained between the driving and driven shafts 6, 7 by proper manipulation of the clutches A and B, and by shifting the various gears with the aid of the levers 42, 43, 44. The various speed changing gears, sleeves and clutches may all be mounted and concealed within a suitable casing 36, and the levers 42, 43, 44 may be shifted through motion transmitting rods 46 which are associated with suitable selector levers located at the operator's station, not shown.

The clutches A, B may be manipulated by means of any suitable actuating mechanism, one embodiment of which is shown diagrammatically in Fig. 1. This mechanism includes an arm 48 rigidly connected to the pivot shaft of the lever 45 for operating the clutch A; a similar arm 49 likewise rigidly connected to the pivot shaft of the lever 47 for operating the clutch B; connecting rods 57, 58 pivotally connected to arms 48, 49 and to T-levers 59, 60; a pair of toggle links 50, 51 having their outer ends pivotally connected to the adjacent arms of the T-levers 59, 60 while their adjoining ends are provided with a lost motion connection in the form of a slot 52; a pair of spaced plungers 53, 54 for swinging the T-levers 59, 60 respectively to place the clutches A, B in operation; an intervening plunger 55 for actuating the toggle links 50, 51 to hold both clutches out of engagement. The plungers 53, 54 are manipulable to effect operation of the improved power transmitting mechanism in the following manner, specific reference being made to the diagrams of Figs. 2 to 4 inclusive.

When the assemblage is set with the aid of the plunger 54 and gear shift mechanism to transmit power at low or 1st speed, it will assume the position shown in Figs. 1 and 2, whereupon the power supply shaft 6 may be driven at any desired speed to positively rotate the outer member 9 at the same speed, the clutch A will be disconnected to avoid rotation of the sleeve 12 and of the gears 22, 23 carried thereby and to permit positive rotation through the inner member 10 of the counter-shaft 11, the 1st speed gear 28 will be in mesh with the corresponding driving gear 32, and the clutch B will be thrown in or active so as to drivingly connect the shaft 11 and sleeve 31 and to thereby rotate these elements at the same speed as that of the drive shaft 6. There will then be no relative rotation between the outer and inner members 9, 10 of the fluid coupling 8 and a drive will be maintained between the driving and driven shafts 6, 7 except for possible slip between members 9 and 10, due to power overload, as long as the mechanism is retained in this condition, the power being transmitted progressively through the coupling 8, counter-shaft 11, friction clutches B, sleeve 13, and intermeshing gears 28, 32 as indicated by the darkened or spotted areas in Fig. 2.

If it becomes desirable to shift to second speed without interrupting the positive drive, the second speed gear 22 should be shifted into mesh with the corresponding driven gear 25, and by subsequently pressing the plunger 53 against the T-lever 59 the clutch A may be actuated. When the plunger 53 is pressed the clutch A will become engaged before the lost motion 52 between the toggle links 50, 51 has been expended or taken up. Only after this lost motion has actually been taken up, will the clutch B be disengaged, but complete disengagement will have been effected when the plunger 53 has been fully depressed. During such momentary transfer and disposition of the elements, both of the sleeves 12, 13 will be geared to the driven shaft 7 by independent gear sets having different speed ratios, and since these sleeves are also positively connected to the two members 9, 10 respectively of the fluid coupling 8, there must be some compensation for the differences in speed. This compensation is effected by relative slippage or rotation of the coupling members 9, 10 which is effected without diminishing the torque and while maintaining a constant drive or transmission of power from the driving shaft 6 to the driven shaft 7. The condition of the apparatus during such momentary shifting is clearly indicated by the dotted or darkened areas in Fig. 3.

As soon as the clutch A has become active and before excessive heating has occurred due to relative slippage of the members 9, 10 in the coupling 8, and after complete depression of the plunger 53 has been effected and the toggle links have spent their lost motion, the clutch B will be disengaged and the over-center link 56 of the clutch B will be inactive while the corresponding links 56 of the clutch A will be in locked clutch engagement position. Power at 2nd speed will then be positively transmitted from the drive shaft 6 through the outer member 9 of the coupling 8 and through the clutch A, sleeve 12 and intermeshing gears 22, 25 to the driven shaft 7, as clearly indicated by the spotted or darkened areas in Fig. 4, and this new setting will prevail until another speed change is desired.

It is to be noted that whenever a shift is made from one speed to the next higher or lower speed, it is necessary to have both clutches A, B momentarily active as in Fig. 3, so that the transfer may be made without interrupting the continuity of the power transmission during any speed change. When shifting back from 2nd speed to low or 1st speed, the elements will assume the successive positions shown in Figs. 4, 3 and 2 respectively. When changing from 2nd to 3rd speed, the elements will momentarily assume a position similar to that of Fig. 3, except that the gears 22, 25 and the gears 29, 33 will be in mesh, and the gears 22, 25 will be disengaged and only the clutch B will be active after the shift has been completed. When shifting back from 3rd speed to 2nd speed, the elements will assume the same successive positions as when stepping up from 2nd speed to 3rd speed, but the gears 29, 33 will then be disengaged and only the clutch A will remain active after this change. When changing from 3rd speed to 4th speed, and vice versa, the gears 29, 33 and the gears 23, 26 will be in mesh simultaneously during either change; but when stepping up, only the clutch A and the gears 23, 26 will remain active after the shift, whereas when stepping down, only the clutch B and the gears 29, 33 will be active when the change has been effected. When shifting from 4th speed to 5th speed, and vice versa, the gears 23, 26 and the gears 30, 34 will be in mesh momentarily when making either change; and when shifting into high only the clutch B and gears 30, 34 will remain active, while the shift from 5th speed into 4th speed will result in maintaining only the clutch A and gears 23, 26 active after the change. Any of these speed changes may be effected by manipulating the proper gear shift levers and clutch actuating plungers, and while all changes result in momentary slippage in the coupling 8 without interrupting the torque or power transmission, it is necessary to transfer from one clutch A, B and from one sleeve 12, 13 to the other whenever a change is made, and the clutch A is active only when even speeds are being transmitted while the clutch B is likewise active only when odd speeds are being transmitted.

The clutches A and B may be of the toggle over center locking type as shown in Fig. 1, or of any other suitable type, so that they may be simultaneously operated and will only be momentarily active at the same time, but these clutches may also be mechanically interconnected so as to prevent simultaneous engagement thereof after speed changes have been effected, while still retaining the advantages of the present invention.

As previously indicated, the improved control mechanism constitutes no part of the present invention and has been omitted in order to avoid undesirable complication in the disclosure, but since the single fluid coupling 8 may have a tendency to become over-heated if subjected to slippage for any great length of time, it may be desirable to utilize a double coupling 38 such as shown diagrammatically in Fig. 5. In this modification, the coupling 38 comprises an outer member 39 having two inner rotors or members 40, 41, disposed therein in such a manner that each of the inner members is adapted to have independent relative or differential rotation with respect to the outer casing. The inner member 40 is positively drivingly connected to the countershaft 11 while the other inner member 41 is likewise positively connected to the disk 18 of the clutch A, and the outer member 39 is not positively connected to either the shaft 11 or to the clutch disk 18. The remainder of this modified transmission assemblage is the same as in Figs. 1 to 4 inclusive, and the normal operation is also similar, except that when slippage occurs during momentary speed changing operations, each of the inner members 40, 41 will assume one-half of the slippage thereby materially reducing the heating tendency.

From the foregoing detailed description of the construction and operation of the device, it will be apparent that my invention provides a relatively simple and readily manipulable constant torque power transmitting mechanism wherein the drive is positively maintained at all times with the aid of mechanical elements of durable construction. In each case, the fluid coupling or substitute device having similar characteristics, coacts with the clutches A, B to permit the new speed change gears to be brought into positive driving coaction before the previously effective gears are thrown out of mesh, and any desired number of independent speed changes may obviously be provided. It is a well known fact that the fluid couplings disclosed will permit differential rotation of the coacting coupling members while maintaining constant torque between the driving and driven elements, and it is this characteristic of these couplings which makes it possible to positively transfer from one speed to another without undesirably stressing or endangering the transmission gears. The improvement may be embodied in power transmissions of various capacities and may be advantageously utilized for numerous purposes, and especially in connection with motor driven vehicles where compactness and great power without interruption, are desirable. While a number of specific terms have been utilized herein for the sake of clearness of description, it is not desired to have the interpretation of these terms unnecessarily restricted since elements such as shafts, sleeves and gears may obviously be replaced by other elements having similar characteristics. The term "fluid coupling" as used herein is also intended to include any mechanical coupling or connection having like torque transmitting characteristics.

It should be understood that it is not my desire to limit this invention to the exact details of construction or to the precise mode of operation, herein shown and described, for various modifications within the scope of the appended claims may occur to persons skilled in the art.

I claim:

1. In a power transmitter, a rotary driving element, a differential coupling having relatively rotatable driving and driven members the former of which is constantly rotatable by said driving element, a rotary driven element, high and low speed gear sets each comprising intermeshing relatively shiftable toothed gears cooperable with said driven element to transmit rotary motion thereto from said coupling, an independent clutch interposed between each of said gear sets and a different member of said coupling, and control mechanism for shifting the gears of said sets progressively and for actuating said clutches to momentarily maintain both of said clutches and at least one of said gear sets active whenever the speed ratio between said elements is being stepped up or down.

2. In a power transmitter, a rotary driving element, a fluid coupling having differentially rotatable driving and driven members the former of which is constantly rotatable by said driving element, a rotary driven element, high and low speed gear sets each comprising intermeshing relatively shiftable toothed gears cooperable with said driven element to transmit rotary motion thereto from said coupling, an independent clutch interposed between each of said gear sets and a different member of said coupling, and control mechanism for shifting the gears of said sets progressively and for actuating said clutches to momentarily maintain both of said clutches and at least one of said gear sets in driving position whenever the speed ratio between said elements is being changed.

3. In a power transmitter, a rotary driving element, a differential coupling having relatively rotatable driving and driven members the former of which is constantly rotatable by said driving element, a rotary driven element, high and low speed gear sets each comprising intermeshing relatively shiftable toothed gears cooperable with said driven element to transmit rotary motion thereto from said coupling, an independent clutch interposed between each of said gear sets and a different member of said coupling, and control mechanism operable to shift the gears of said sets progressively and to actuate said clutches so as to momentarily maintain both of said gear sets active whenever the speed ratio between said elements is being increased or diminished.

4. In a power transmitter, a rotary power shaft, a rotary driven shaft, a constant torque fluid coupling rotatable by said driving shaft and having differentially rotatable members, an independent friction clutch associated with each of said members to deliver rotary motion therefrom, a set of intermeshing gears interposed between each of said clutches and said driven shaft, and control mechanism for simultaneously shifting the gears of said sets progressively and for actuating said clutches, said mechanism cooperating with said coupling to momentarily maintain both of said gear sets in mesh whenever the speed ratio between said driving and driven shafts is being increased or diminished.

5. In a power transmitter, a rotary driving shaft, a rotary driven shaft disposed parallel to said driving shaft, a counter-shaft disposed in axial alinement with said driving shaft and laterally of said driven shaft, a constant torque fluid coupling having differentially rotatable members drivingly connected to said driving and counter-shafts respectively, alined sleeves embracing said counter-shaft, a friction clutch connected to one of said coupling members for transmitting rotary motion therefrom to one of said sleeves, another friction clutch connected to said counter-shaft for transmitting rotary motion therefrom to the other of said sleeves, and a set of speed changing gears interposed between each of said sleeves and said driven shaft.

6. In a power transmitter, a rotary driving shaft, a rotary driven shaft, a constant torque fluid coupling rotatable by said driving shaft and having differentially rotatable members, a counter-shaft disposed in axial alinement with said driving shaft and parallel to said driven shaft and being drivingly connected to one of said members, independent sleeves embracing said counter-shaft, a clutch for drivingly connecting one of said sleeves directly to one of said coupling members, another independent clutch for drivingly connecting the other of said sleeves directly to said counter-shaft, and sets of intermeshing toothed gears having different speed ratios and being drivingly interposed between said sleeves and said driven shaft, the differential rotation of each coupling member permitting several of said gear sets to remain in mesh progressively whenever the speed ratio between said driving and driven shafts is being increased or diminished.

7. In a power transmitter, a rotary driving shaft, a fluid coupling having differentially rotatable driving and driven members the former of which is constantly rotatable by said driving shaft, a rotary driven shaft, high and low speed gear sets each comprising relatively shiftable toothed gears cooperable with said driven shaft to transmit rotary motion thereto from said coupling, an independent friction clutch interposed between each of said gear sets and a different member of said coupling, and control mechanism for shifting the gears of said sets progressively and for actuating said friction clutches to momentarily maintain both of said clutches and at least one of said gear sets in driving position whenever the speed ratio between said shafts is being changed.

8. In a power transmitter, a rotary driving shaft, a differential coupling having relatively rotatable driving and driven members the former of which is constantly rotatable by said driving shaft, a rotary driven shaft, high and low speed gear sets each comprising intermeshing relatively shiftable toothed gears cooperable with said driven shaft to transmit rotary motion thereto from said coupling, an independent friction clutch interposed between each of said gear sets and a different member of said coupling, and control mechanism operable to shift the gears of said sets progressively and to actuate said friction clutches so as to momentarily maintain both of said gear sets active whenever the speed ratios between said shafts is being increased or diminished.

WENDELL K. BECKWITH.

REFERENCES CITED

The following references are of record in the file of this patent:

UNITED STATES PATENTS

| Number | Name | Date |
|---|---|---|
| 1,667,565 | Radcliffe | Apr. 24, 1928 |
| 1,689,244 | Klimek | Oct. 30, 1928 |
| 1,689,245 | Klimek | Oct. 30, 1928 |
| 1,724,202 | Jacobs | Aug. 13, 1929 |
| 2,171,715 | Sinclair | Sept. 5, 1939 |
| 2,213,342 | Gossler | Sept. 3, 1940 |
| 2,324,733 | Smirl | July 20, 1943 |
| 2,344,656 | Swennes | Mar. 21, 1944 |
| 2,355,709 | Dodge | Aug. 15, 1944 |

FOREIGN PATENTS

| Number | Country | Date |
|---|---|---|
| 153,993 | Austria | Aug. 10, 1938 |
| 517,519 | Great Britain | July 7, 1938 |
| 686,626 | France | Dec. 13, 1929 |